Patented Sept. 25, 1928.

1,685,635

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CATALYTIC OXIDATION OF ANTHRACENE.

No Drawing.  Application filed December 23, 1927. Serial No. 242,297.

The present invention relates to the processes for the catalytic oxidation of anthracene in the vapor phase to anthraquinone.

In the past relatively pure anthracene has been oxidized in the vapor phase to anthraquinone by passing the vapors admixed with oxidizing gases over catalysts containing metals of the fifth and sixth groups of the periodic system, especially oxides such as vanadic oxide, molybdenum oxide, and the like. The processes used hitherto have been relatively unsuccessful as the catalysts did not give high yields with commercially feasible outputs. There is a tendency to over-oxidation, resulting in total combustion and an enormous increase in the exotherm of the reaction and if the catalyst is sufficiently diluted or the reaction sufficiently damped to prevent large amounts of total combustion, serious trouble arises due to the fact that part of the anthracene will remain unoxidized and contaminate the product. The large amounts of total combustion which usually take place when the reaction is carried out with the catalysts used hitherto necessitate strong temperature control, such as, for example, by the use of boiling metal baths in heat exchanging relation with the catalyst zones. Even when the average temperature of the contact mass is controlled there is a serious tendency of catalysts hitherto used to form zones of local over-heating due to the excessive activity of the catalysts and to the fact that perfectly homogeneous dilution has not been feasible hitherto.

The present invention overcomes partly or wholly most of the disadvantages set out above and consists broadly in the oxidation of anthracene and anthracene containing compounds, especially in the vapor phase, in the presence of catalysts or contact masses in which part or all of the catalytically active elements are present in the form of two component zeolites, that is to say, base exchanging polysilicates which are formed by methods analogous to those of the natural or artificial water-softening zeolites which are usually either aluminum double silicates or aluminosilicates. Among the natural zeolites are nepheline, leucite, felspars, and the like, and numerous artificial aluminum zeolites have been prepared for water-softening means. In general, two component zeolites are prepared by the reaction of two classes of components, i. e. silicates and either metallates or metal salts. The reaction may be in solution or in the molten state. Throughout the present application, the word "zeolite" will be strictly limited to, base exchanging polysilicates which are prepared or result as the reaction products of two classes of reacting components, at least one of which is a silicate, together with their derivatives.

The zeolite catalysts of the present invention are characterized by a highly porous, honeycomb like structure and show high resistance to melting, recrystallization and poisoning. The zeolites may be used either diluted or undiluted, but for best results in the catalytic oxidation of anthracene I prefer to use diluted zeolites in which the diluent bodies are preferably homogeneously mixed with the zeolite components. The invention, of course, is not limited to the use of these diluted zeolite catalysts, which constitute the preferred embodiment thereof, and undiluted zeolites may be used or they may be mixed mechanically with diluents or impregnated into porous diluents.

The catalytic elements may be present in zeolites in four different forms, namely in the zeolite nucleus, that is to say, in non-exchangeable form, as one of the exchangeable cations of the zeolite, as an anion which may form with the zeolite a salt-like body, and finally in the case of diluted zeolites in the diluent, which may either be itself a catalyst or may be impregnated with catalytic components. Obviously, of course, catalytic elements may be present in more than one of these forms in a single catalyst and a large number of such combinations are possible.

In addition to the elements which are actual catalysts, certain other elements, while not themselves catalysts, or at least not strong catalysts, appear to exert a marked effect on the catalytic components themselves and may be termed activators. The $SiO_2$ group notably appears to possess marked activating powers and it is one of the advantages of the present invention that the same zeolite structure or framework which permits the fine or molecular distribution of catalytic atoms or groups in a highly porous, physically homogeneous product, also supplies the activating $SiO_2$ group.

It is an advantage of the zeolites of the present invention that by suitable treatment with acid gases the exchangeable alkali of the zeolites may be transformed into non-alkaline compounds which tend to stabilize the oxidation of anthracene and which are formed in intimate homogeneous association with the catalytically active components. Stabilizers may also be added to zeolites in a pre-formed state. I do not claim in this invention the use of such stabilizers generally, this forming the subject of my co-pending application No. 196,393, filed June 3, 1927. In the present application, however, all such stabilizing means mixed with or formed on zeolite catalysts are included as specific features of the present invention.

It is an advantage of the present invention that an enormous number of different catalysts can be prepared, all sharing the extremely advantageous physical structure of the zeolites and being provided with suitable silicious activating components. The chemical combination of the zeolite molecule is not accurately known because it is impossible to obtain the molecular weight of the product without disintegrating it. Without limiting the present application to any theories of zeolite constitution, I am of the opinion that the zeolite molecules existing in actual products are of extremely high molecular weight because I have found that catalytic components can be introduced and chemically combined in the zeolite nucleus in substantially any desired proportions. This indicates that the molecule is not of low weight, as otherwise, the law of molecular proportions would at once become apparent. It is, of course, possible that the zeolites are not of high molecular weight, but consist of a solid solution of different simple zeolites. The underlying chemical reasons are, however, not important, the main thing being that it is possible to introduce catalytic components in almost any desired proportions into the zeolite molecule in non-exchangeable form so that it is possible to prepare catalysts having just the right proportions of one or more catalytic components for any particular reaction, a feature which is of enormous value to the catalytic chemist.

The nucleus or non-exchangeable portion of the zeolite molecule is ordinarily considered to consist of metal oxides, usually amphoteric metal oxides, combined with $SiO_2$ to form an anion which appears to behave as a single group and cannot be split by ordinary chemical means without destroying the zeolite. A large number of catalytically active metal oxides may be introduced into this portion of the zeolite nucleus either in the form of their metallates or in the form of neutral or acid salts or complex compounds. In some cases, it may be necessary to introduce the desired metal in a stage of oxidation different from that which it is to finally possess in the finished zeolite and effect suitable oxidation or reduction during zeolite formation. The following elements in suitable stages of oxidation in which they possess the desired amphoteric properties may be included in the metal oxide portion of the zeolite: copper, silver, gold, bismuth, beryllium, zinc, cadmium, boron, aluminum, rare earths, titanium, zirconium, tin, lead, thorium, niobium, antimony, tantalum, chromium, molybdenum, tellurium, tungsten, uranium, vanadium, manganese, iron, nickel, cobalt, osmium, arsenic. They may be introduced singly or in mixture in any desired proportion and may be in the form of simple or complex ions.

I have found that the oxidation of anthracene, particularly to anthraquinone, is most effectively carried out in the presence of zeolite catalysts which contain vanadium chemically combined in non-exchangeable form as a metal oxide component of their nucleus and this may be considered the preferred type of catalyst for producing anthraquinone.

The vanadium which is present in the nucleus may be in the form of trivalent, tetravalent or pentavalent vanadium, and for some catalysts it is very desirable to introduce into the nucleus part of the vanadium in one state of oxidation and part in another. A similar possibility exists with respect to other metal elements which are capable of introduction in different stages of oxidation and particularly with elements of the fifth and sixth groups, such as: niobium, antimony, tantalum, chromium, molybdenum, tungsten, bismuth and uranium.

The $SiO_2$ portion of the zeolite nucleus does not necessarily have to consist solely of $SiO_2$, although for many catalysts the activating or stabilizing effect of the $SiO_2$ radical makes this desirable. In other cases, it may be desirable that part of the $SiO_2$ should be substituted by a suitable acidic oxide which is capable of zeolite formation, and in this way components of catalytic, activating or stabilizing effect can be introduced, such as, for example, one or more of the acidic oxides of: phosphorus, sulfur, tin, titanium, tungsten, chromium, niobium, tantalum, uranium, molybdenum, arsenic, antimony, vanadium, etc. The present invention, however, does not include processes of oxidation in which a base exchange catalyst is used which does not contain $SiO_2$. Such catalysts do not come under the definition of the word "zeolite" as used in the present invention, and form the subject-matter of the co-pending application, Serial No. 171,727, filed February 28, 1927.

Additional catalytic, activating or stabilizing components can be introduced by base exchange. Examples of such components are the simple or complex ions of: lithium, sodium, potassium, ammonium, copper, rubidium, cæsium, silver, gold, beryllium, magnesium, calcium, zinc, strontium, cadmium, barium, mercury, aluminum, thallium, titanium, zirconium, tin, antimony, thorium, vanadium, bismuth, chromium, uranium, manganese, cobalt, iron, palladium, platinum.

After the zeolite is formed, it may then be caused to react with compounds having suitable anions which form with the zeolite bodies which behave in many ways as if they were salts. It is not known whether actual salts are formed, since, of course, the products are for the most part not soluble in water, and the invention is, therefore, not limited to any particular chemical theory of combination. Among the anions which can be caused to react with zeolites under suitable conditions to form salt-like bodies are the acidic oxides of the following elements: vanadium, tungsten, uranium, chromium, molybdenum, manganese, tantalum, niobium, antimony, selenium, tellurium, arsenic, phosphorus, bismuth, sulfur, chlorine, platinum, and boron. These elements may be introduced in the form of simple or complex anions, such as for example, ferro and ferricyanogen, sulfocyanogen, metal cyanogen, and ammonia complexes may also be caused to react with zeolites. A single anion or a plurality of anions can be caused to react either simultaneously or successively. It will thus be apparent that there are four groups within the zeolite body, the non-exchangeable nucleus with its metal oxide and acidic oxide components, the exchangeable cations and the anions which form with the zeolite salt-like bodies. The effect of a particular catalytic element is not necessarily the same when it is present in the nucleus as when it is present, for example, as an exchangeable cation, and it is thus possible to form innumerable combinations which permit the catalytic chemist to produce catalysts having characteristics exactly adjusted for the particular oxidation which he desires to carry out.

In all cases, the catalytic components are distributed throughout the zeolite molecule in a state of molecular subdivision and apparently are protected to a large extent by the surrounding zeolite skeleton or framework so that they are far less subject to poisoning and to other deleterious influences. The products are also for the most part highly resistant to the temperatures which obtain in the catalytic oxidations in question, and the highly porous, honeycomb-like structure of the zeolite operates to greatly enhance the catalytic activity of the catalytic components.

As has been pointed out above, it is usually not desirable to use diluted zeolites as catalysts in the oxidation of naphthalene because, unless the proportion of catalytic component is very small, the catalysts are too strong and tend to evolve excessive amounts of heat since most of the reactions are highly exothermic. While in certain cases, therefore, it is possible to use undiluted zeolite catalysts in organic oxidations, and the present invention includes such use. I prefer, for the most part, to use diluted zeolites, which, in general, are of more satisfactory catalytic activity and which also usually are cheaper to produce, as, in general, the diluent bodies used are less costly than the zeolite components themselves.

Almost any inert or activating body can be used as a diluent. Preferably, however, I use porous diluents and particularly diluents which are rich in silica in order to enjoy the valuable stabilizing and activating properties of the $SiO_2$ group, which has been mentioned in connection with the zeolite structure itself. The use of diluents rich in silica is particularly important. A few of the many possible diluents are the following: kieselguhrs of all kinds, particularly natural or treated Celite earths, (these "Celite" earths are a compacted type of kieselguhr mined on the Pacific coast by the Celite Products Company) silicious powders of all kinds, powdered zeolites, either natural or artificial, powders of rock, stones, tuffs, trass, lava and similar volcanic products which are frequently highly porous, green sand, glauconite, pulverized slag wool, cements, sand, silica gel, pulverized earthenware, fuller's earth, talc, glass powder, pumice meal, asbestos, graphite, quartz meal and powders of various minerals rich in quartz, metal powders, metal oxides and salts, particularly tungstates, vanadates, chromates, uranates, manganates, cerates, molybdates, etc. Some of these diluents are inert, others contain silica and may be considered as activators, and still others are themselves catalytically active. It should be noted that when an inert body is sufficiently finely divided, as for example, when the average particle size is less than 60 microns, the diluent possesses surface energy which increases the absorption and diffusion speed and porosity of the final product and, therefore, may be considered as a kind of physical catalyst or activator.

The diluents may be incorporated in many ways. For example, they can be mixed with one or more of the zeolites before formation. The zeolite gel immediately after formation may be mixed with diluents, or a combination of these processes can be carried out. Zeolite components or the finished gel may be impregnated into diluents, usually porous diluents and the like. When the diluent is mixed with components or gel before hardening, and in some cases, where the zeolite components are impregnated into the diluent in considerable amount, the resulting product is a physically homogeneous whole, in which the diluent particles are uniformly distributed throughout the zeolite framework, and for many purposes this type of product is the most satisfactory, although the invention is in no sense limited thereto. It should be understood that diluent bodies may be impregnated with various catalytic components before incorporation in the zeolite, and many highly active catalysts can be produced in this way. The impregnation may be by precipitation, reduction, oxidation or by the introduction of colloidal suspensions, or solutions of the catalytic component. In some cases, catalytic components may also be caused to react with the diluent or to form therewith chemical compounds, although this is not as common, since most of the diluents are relatively inert chemically.

Many possible types of diluted zeolites and processes are fully described in a large number of examples in the application of Jaeger & Bertsch, Serial No. 95,771, filed March 18, 1926, and any of the processes and products therein described may be used to produce catalysts of the present invention.

Instead of incorporating catalytic components chemically combined with the zeolite, a non-catalytic zeolite may be used as a carrier or diluent for catalytic components impregnated into the fine pores of a natural or artificial zeolite. In such a case, the zeolite acts as an activator by reason of its physical structure and its high content of silica. Instead of impregnating catalytic components into a finished zeolite, it is also possible to incorporate insoluble catalytic bodies with the components of the zeolite during formation so that the catalytic particles are uniformly and homogeneously distributed throughout the zeolite structure, but are, of course, in most cases, not in a state of molecular division as in the case of catalytic components chemically combined with the zeolite. Another important class of catalysts is produced by impregnating inert or activating diluent bodies with catalytic components and then incorporating these impregnated diluents with a zeolite which is not itself catalytically active. In all cases, the advantages of the zeolite structure are obtained and the particular catalyst to be used in any given reaction will be determined by the conditions of that reaction.

In some cases, the homogeneous diluted zeolite may advantageously be in the form of a film or coating on massive carrier granules or fragments and such contact masses are included in the present invention. The massive carriers may be inert, activating or themselves catalytic, as, for example, when certain catalytic metal alloys are used. Certain contact masses using metal fragments as massive carriers are also of importance in some exothermic reactions as they tend to improve the heat conductivity of the catalyst layer and prevent the formation of local hot spots which are so serious in anthracene oxidations.

The remarkable effectiveness of the zeolite catalysts of the present invention for the oxidation of anthracene is probably due to a number of features such as the advantageous porous, physical structure of the catalysts, their high resistance to the temperatures which obtain in the reactions, the activating power of the silica present, etc. Without limiting the invention to any theories, however, I am of the opinion that one of the most important reasons for the effectiveness of the catalysts lies in the fact that the zeolite framework separates the individual catalyst particles or catalyst molecules from each other so that at no point in the catalyst is there a large amount of active catalytic material present. There is, therefore, not such a tendency to the formation of local hot spots due to too violent reactions. I have found that in anthracene oxidations, the intermediate products are more or less unstable, particularly in the presence of the catalysts which cause their formation and at elevated temperatures. I am, therefore, of the opinion that the far reaching isolation, and to a certain extent, insulation of one catalyst particle or molecule from the other prevents the decomposition of the intermediate products formed because they are almost immediately brought out of contact with the catalyst and the heat evolved is uniformly distributed throughout the zeolite framework.

For the oxidation of anthracene, the presence of an alkali is sometimes undesirable, especially where it is desired to obtain anthraquinone as the reaction product, and the alkalinity of most zeolites is preferably neutralized, and in many cases it is desirable to have the product distinctly acid. This neutralizing of alkali can be effected in several ways. In the first place, the zeolite reaction can be caused to take place in solutions which are not strongly alkaline. The resulting products have a comparatively low base exchange power and perhaps there is formed a mixture of zeolites and non-base exchanging polysilicates. The physical structure, however, is similar to that of the zeolites, which possess strong base exchanging powers, and for many purposes the catalysts are just as effective. In some reactions, this diminished alkalinity may be sufficient to permit the reaction to be carried out satisfactorily. In other cases, where even this degree of alkalinity is undesirable, the zeolite may be treated with acids to form salt-like bodies which are acid in their nature, the product, of course, varying with the amount of acid which is caused to react with the zeolite. I have found, however, that in the case of most catalysts, it is desirable to subject the product to treatment with an acid gas at temperatures of from 400–500° C., in the presence of air or other oxidizing medium. Such acid gases may be $SO_2$, $SO_3$, halogens, oxides of nitrogen, etc., and the process is described in my Patents Nos. 1,678,626 and 1,678,627, patented July 24, 1928.

This procedure in the case of most zeolite catalysts has the additional advantage that the acid gas reacts with the alkali present to form salts of the alkali forming metals, which, as has been pointed out above, act as stabilizers and tend to prevent the reaction becoming uncontrolled and proceeding to total combustion with serious losses in yield. This treatment also appears in most cases to enhance the activity of the zeolite and possibly this is due to physical changes which may take place. In general, it should be clearly understood that all zeolite catalysts undergo certain secondary chemical, and perhaps physical transformations during catalysis, and, therefore, the use of the word "zeolite" or "zeolite body" in the claims is not intended to limit the present invention to processes in which the zeolite identity of the catalyst remains throughout the reaction. The nature of these secondary transformations is not definitely known and, therefore, in the claims the word "zeolite" is used to cover zeolites which have undergone secondary changes during catalysis as a result of preliminary treatment with acid gases. In all cases, however, the macroscopic, and in many cases, the microscopic, physical structure of the zeolite catalyst remains unchanged.

For the most part, zeolite catalysts of the present invention are sufficiently porous, but in some cases it may be desirable to still further increase this porosity. In such cases, soluble, volatile or combustible fillers may be incorporated into the zeolite and later on removed, leaving corresponding hollow spaces and still further increasing the porosity of the product.

In most cases, the zeolite catalysts are of sufficient mechanical strength to withstand all the ordinary strains to which they are subjected during catalysis. In some cases, however, particularly where the zeolite is diluted with a very large amount of diluents, the mechanical strength may be insufficient for catalytic purposes. In such cases, the product may be washed with waterglass, particularly dilute solutions of waterglass, and a certain amount of surface silicification is thereby effected. At the same time, this treatment may be used to neutralize or change the degree of alkalinity of the product.

In the following specific examples a number of representative zeolite catalysts are described, but the invention is, of course, not limited to the catalysts specifically enumerated, nor to the methods of formation of the catalysts therein described, although an attempt has been made to illustrate as many as possible of the representative methods. In general, however, any suitable processes for the formation of the zeolites may be used, such as for example the processes described in the copending applications of Jaeger & Bertsch, Serial No. 91,229, filed Feb. 27, 1926, Serial No, 95,771, filed Mar. 18, 1926, and Serial No. 100,116, filed Apr. 6, 1926.

*Example 1.*

The following five mixtures are made:
(1) 7 mols of $SiO_2$ in the form of a 30–33° Bé. potassium waterglass solution are diluted with 8 volumes of water and 2 mols of a 10% solution of potassium phosphate are added. Finely ground asbestos fibers are then stirred in until the mixture just remains easily stirrable.
(2) 1 mol of a 10 N aqueous solution of potassium tungstate is prepared.
(3) ½ mol of vanadic acid is dissolved in caustic potash to form a 10 N solution.
(4) ½ mol of molybdic oxide is dissolved in caustic potash to form a 10 N solution.
(5) ½ mol of $V_2O_5$ is melted with oxalic acid in order to reduce it and is then dissolved up in 10% caustic-potash solution to form the coffee brown vanadite.

Solutions 2, 3 and 4 are then mixed and poured into suspension 1 to which solution 5 is added with vigorous agitation. The mixture is heated up to 65–70° C. and a 10% sulfuric acid solution is added in small portions until a gel is formed. The solution should remain at all times alkaline to litmus. A diluted zeolite precipitates out containing in non-exchangeable form tetravalent and pentavalent vanadium, tungsten and molydenum, together with a mixture of $SiO_2$ and phosphoric acid. A 3–5% ferrous sulfate solution is permitted to trickle over the zeolite which results in exchanging at least part of the alkali of the zeolite for iron.

Anthracene vapor and air in the proportion of 1 gr. anthracene to 20–30 l. of air is passed over the catalyst in a suitable converter at temperatures preferably between 360 and 380° C. A high yield of anthraquinone is obtained and the product is of high purity, being practically free from further oxidation products such as phthalic anhydride and maleic acid.

*Example 2.*

The following mixtures are prepared:

(1) 280 parts of pumice meal or asbestos fibers are impregnated with about 2% of cobalt in the form of the nitrate, dissolved in sufficient water to permit impregnation, to form a moist mass. The impregnated pumice is then stirred into a waterglass solution of about 33° Bé. containing 4–5 mols of $SiO_2$, which solution has been previously diluted with about 5–6 volumes of water.

(2) .5 mol of $V_2O_5$ is dissolved in sodium hydroxide to form a normal solution which is almost neutral to litmus. About .7 mol of iron in the form of ferrous sulfate in moderate dilute aqueous solution is then added and iron vanadate mixed with iron oxide is precipitated.

(3) 1 mol of $V_2O_5$ is treated with 2% of its weight of concentrated sulfuric acid and diluted with 20 parts by weight of water. The mixture is boiled gently and gaseous $SO_2$ is passed through the acidified vanadic acid suspension until a clear blue solution of the vanadyl sulfate is formed. The blue solution is then gradually treated with 10 N caustic soda until the precipitate of vanadyl hydroxide which forms at first dissolves in the caustic soda to form a coffee brown sodium vanadite solution.

The suspensions 1 and 2 are then poured together and at once the solution 3 is permitted to flow in in a thin stream with vigorous agitation. Most of the excess alkali is neutralized with 10% sulfuric acid and the gel which forms is well pressed, washed two or three times with 300 parts of water and dried at temperatures of 100° C. The product is a zeolite body containing tetravalent vanadium diluted with impregnated pumice meal or asbestos fibers and iron vanadate.

The product is cautiously treated with 3–5% hydrochloric, sulfuric or phosphoric acid so as not to destroy the zeolite structure of the body, and dried, preferably under 100° C. A salt-like body results. The catalyst is then dehydrated by blowing air over it and gradually permitting the temperature to rise to 450° C.

The catalyst thus prepared is excellent for the vapor phase oxidation of anthracene to anthraquinone and acenaphthene and its halogen derivatives to the corresponding naphthalic anhydrides. The vapors of the aromatic hydrocarbon should be mixed with air in the proportion of 1:18 by weight and passed over the catalyst at about 330–420° C. The proportions of anthracene or acenaphthene to air can also be varied within fairly wide limits without seriously affecting the yield.

*Example 3.*

60 parts of Celite or a mixture of 40 parts Celite and 40 parts finely broken quartz, pumice, glass, neutral silicates or asbestos fibers are suspended in 300 parts of water. To this slurry is added a solution of potassium vanadate containing 14 parts of $V_2O_5$ dissolved in 5 N potassium hydroxide solution containing 12 parts of 100% KOH. The mixture is heated up to 60–65° C. and 2 N sulfuric acid is added with vigorous agitation precipitating finely divided $V_2O_5$ in the carrier material. The amount of 2 N sulfuric acid should be so chosen as to result in a solution which is acid to congo. The suspension is then heated for one-half an hour at 90° C. with vigorous agitation so that the $V_2O_5$ which is present in colloidal solution is completely precipitated. The mixture is then sucked and the cake washed with water until the wash water is no longer acid to congo, whereupon the cake is dried and comminuted. 100 parts of potassium waterglass solution of 30° Bé. are diluted with 24–40 parts of water and kneaded into the impregnated carrier described above, the kneading being continued until the brown color of the $V_2O_5$ has disappeared. The product is then formed into fragments and constitutes a diluted zeolite, in which $V_2O_5$ is present in non-exchangeable form.

In a similar manner, a zeolite can be prepared by substituting an equivalent amount of potassium vanadite for the potassium vanadate, in which case, the zeolite will contain tetravalent vanadium. A mixture of the solutions may also be used, producing a zeolite containing both tetravalent and pentavalent vanadium in non-exchangeable form.

The catalyst thus produced can be used in the vapor phase catalytic oxidation of anthracene to anthraquinone or toluol and its derivatives, such as xylols, mesitylene, pseudocumene and paracymene to the corresponding aldehydes. The hydrocarbon vapors are mixed with air or other oxygen containing gases in the proportion of from 1:3 to 1:5, the figures being based on the oxygen content of the gases, and the mixture is then passed over the catalyst at 320–420° C.

Still better results can be obtained when oxidizing anthracene to anthraquinone if the zeolite is repeatedly digested with 5% ferric sulfate or ferric chloride, thus introducing ferric iron by base exchange.

*Example 4.*

A molybdic oxide kieselguhr suspension is prepared by dissolving 14.4 parts of molybdic oxide in the form of postassium molybdate in 400 parts of water, and thoroughly stirring in 60 parts of kieselguhr, the oxide being then precipitated in a fine state of subdivision by adding a suitable amount of 10% sulfuric acid. The suspension is then treated with a mixture of 140 parts of 33° Bé. potassium waterglass solution diluted with 300 parts of water and 10 parts of copper nitrate in the form of a 5% cuprammonium nitrate solution. 10% sulfuric acid is then added until the whole mass solidifies to a gel which is pressed, washed and then impregnated with 5% nitric acid in order to destroy the alkalinity. The treatment is followed by calcination at 400° C.

Anthracene vapors mixed with air in the proportion of 1 : 10 are passed over the catalyst at 380–450° C. and excellent yields of anthraquinone are obtained.

What is claimed as new is:

1. A method of oxidizing anthracene containing material to anthraquinone, which comprises causing vapors of anthracene containing material admixed with an oxidizing gas to react in the presence of a catalyst containing a zeolite.

2. A method of oxidizing anthracene containing material to anthraquinone, which comprises causing vapors of anthracene containing material admixed with an oxidizing gas to react in the presence of a catalyst containing a diluted zeolite.

3. A method of oxidizing anthracene containing material to anthraquinone, which comprises causing vapors of anthracene containing material admixed with an oxidizing gas to react in the presence of a catalyst containing a diluted zeolite having catalytically active diluents.

4. A method of oxidizing anthracene containing material to anthraquinone, which comprises causing vapors of anthracene containing material admixed with an oxidizing gas to react in the presence of a catalyst containing a zeolite, at least part of the catalytically active element being present in chemical combination with or in the zeolite.

5. A method of oxidizing anthracene containing material to anthraquinone, which comprises passing anthracene containing material vapors admixed with an oxidizing gas over a catalyst containing a zeolite, at least part of the catalytically active elements being chemically combined in the zeolite in non-exchangeable form.

6. A method of oxidizing anthracene containing material to anthraquinone, which comprises causing anthracene containing material vapors admixed with oxidizing gas to react in the presence of a catalyst containing a zeolite which has been treated with substances containing acid radicals to form the so-called salt-like body.

7. A method of oxidizing anthracene containing material to anthraquinone, which comprises causing anthracene containing material vapors admixed with an oxidizing gas to react in the presence of a catalyst containing a zeolite, at least one catalytically active component of the catalyst containing vanadium.

8. A method of oxidizing anthracene containing material to anthraquinone, which comprises causing anthracene containing material vapors admixed with an oxidizing gas to react in the presence of a catalyst containing a zeolite having vanadium chemically combined in or with the zeolite.

9. A method of oxidizing anthracene containing material to anthraquinone, which comprises causing anthracene containing material vapors admixed with an oxidizing gas to react in the presence of a catalyst containing vanadium chemically combined with a zeolite in non-exchangeable form.

10. A method according to claim 6 in which at least one of the acid radicals caused to react with the zeolite is catalytically active.

11. A method according to claim 6 in which a vanadium containing acid radical is caused to react with the zeolite to form the salt-like body.

12. A method according to claim 1 in which at least one catalytically active base is chemically combined in the zeolite in exchangeable form.

13. A method according to claim 1 in which the catalyst contains compounds of iron.

14. A method according to claim 1 in which the catalyst contains both vanadium and iron.

Signed at Pittsburgh, Pa. this 19th day of December, 1927.

ALPHONS O. JAEGER.